United States Patent [19]
Landis

[11] 4,438,273
[45] Mar. 20, 1984

[54] ISOIMIDE CONTAINING OLIGOMERS

[75] Inventor: Abraham L. Landis, Northridge, Calif.

[73] Assignee: Hughes Aircraft Company, El Segundo, Calif.

[21] Appl. No.: 286,317

[22] Filed: Jul. 24, 1981

[51] Int. Cl.³ .................. C07D 307/66; C07D 307/90; C07D 307/77

[52] U.S. Cl. .................................... 549/303; 528/125; 528/128; 528/172; 528/188; 528/208; 528/352; 528/353; 549/297; 549/298; 549/299; 549/320

[58] Field of Search ............... 528/125, 128, 172, 188, 528/208, 352–353; 549/297, 298, 299, 300, 301, 303, 320

[56] References Cited

U.S. PATENT DOCUMENTS

| | | | |
|---|---|---|---|
| 3,261,811 | 7/1966 | Tatum | 528/353 |
| 3,282,898 | 11/1966 | Angelo | 528/353 |
| 3,316,212 | 4/1967 | Angelo | 528/353 |
| 3,345,342 | 10/1967 | Angelo | 528/353 |
| 3,413,267 | 11/1968 | Kreuz | 528/353 |
| 3,516,967 | 6/1970 | Funer | 528/353 |
| 4,075,171 | 2/1978 | D'Alelio | 528/353 |
| 4,148,625 | 4/1979 | Nagase | 549/303 |
| 4,168,360 | 9/1979 | D'Alelio | 528/188 |
| 4,276,407 | 6/1981 | Bilow et al. | 528/352 |
| 4,307,220 | 12/1981 | Lucarelli et al. | 528/128 |

Primary Examiner—Lester L. Lee
Attorney, Agent, or Firm—A. W. Karambelas

[57] ABSTRACT

A class of relatively low molecular-weight oligomers containing at least one isoimide group and terminal groups capable of undergoing an addition polymerization reaction. The oligomers of the present invention are characterized by excellent solubility in common solvents and a melting temperature considerably lower than their cure temperature, thus enabling the oligomers to be formed into cured polymers more slowly and at lower temperatures, all without the evolution of deletrious gases.

11 Claims, No Drawings

ISOIMIDE CONTAINING OLIGOMERS

The present invention is directed to oligomers, and in particular, to a class of relatively low-molecular weight oligomers which contain at least one isoimide group along with functional groups that enable the oligomers to be cured by addition polymerization.

Polymers formed of polyimides are well known to the art. As is described in U.S. Pat. No. 3,179,634, such polyimides are characterized by repeating units having the formula:

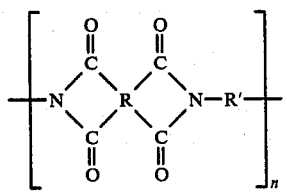

where R is a tetravalent aromatic group and R' is a divalent aryl group. Such polymers are known to be useful in the molding of films, fibers and the like having high tensile strength, good electrical properties and stability with respect to heat and water.

One of the primary drawbacks to polyimide polymers of the type described above arises from the method by which such polymers are prepared. Generally, the polymers are prepared by a condensation reaction in which a diamine is reacted with a dianhydride to form a corresponding polyamic acid which can then be converted to the corresponding polyimide by heating. As those skilled in the art will appreciate, that condensation reaction is accompanied by the release of water vapor which, when liberated during a molding operation, can cause voids and other defects in molded products.

Substantial improvements over polyimide polymers of the type described in the above patent have been achieved as described in U.S. Pat. Nos. 3,864,309, 3,845,018, 3,879,349, and 3,928,450, the disclosures of which are incorporated herein by reference. As described in the foregoing patents, it has been discovered that the disadvantages of polyimide oligomers of the type described, and specifically the tendency of the liberated water vapor to cause voids during molding, can be completely eliminated or substantially prevented when a polyimide oligomer is terminated with a acetylenic group capable of undergoing an addition polymerization reaction. As is described in the foregoing patents, acetylenic-terminated polyimide oligomers can be polymerized, either with or without a catalyst, to form polymers which exhibit an extremely low void content along with high thermal stability characteristics and high structural strength.

While the oligomers described in the foregoing patents represent a significant advance in the art, they tend to have poor solubility in common lacquer solvents along with relatively high melting points. Thus, at the high processing temperatures required, such oligomers cure too rapidly for use in many applications, particularly where the polymer is used to form a laminate over a large surface area.

It has now been found that the foregoing disadvantages can be prevented or substantially minimized where at least some of the imide functional groups are replaced by a corresponding isoimide functional group. The presence of the isoimide group unexpectedly improves the solubility of such oligomers in common solvents, and, quite surprisingly, results in a substantial decrease in the melting point of the oligomer. Thus, oligomers containing an isoimide group in accordance with the practice of this invention can be cured at a more controlled rate using a greater variety of common solvents to form cured polymers having essentially the same properties and characteristics as those derived from the corresponding imide oligomer.

It is accordingly an object of the present invention to provide oligomers which can be used in producing void-free composite structures having good solubility in common solvents.

It is another object of the present invention to provide oligomers which are capable of producing void-free composite structures by addition polymerization having relatively low melting points, and thus can be cured in a controlled manner.

The concepts of the present invention residue in an oligomer which contains at least one isoimide group along with at least two terminal groups capable of undergoing addition polymerization, either alone or in combination with a comonomer. As noted above, the presence of the isoimide grou results in a reduction of the melting point of the oligomer and an increase in the solubility of such oligomer in common solvents, as compared to oligomers prepared from the same reagents which contain imide functional groups.

In their simplest form, the oligomers of the present invention are prepared by a reaction of an organic carboxylic polyanhydride and a mono-amine compound containing a functional group capable of undergoing addition polymerization reactions. Thus, the polyanhydride and the amine react to form a corresponding polyamic acid, which is then subjected to the action of a dehydrating agent to convert the polyamic acid to an oligomer containing at least one isoimide group having the structure:

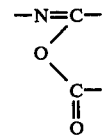

Using benzophenonetetracarboxylic dianhydride and 3-aminophenylacetylene as illustrative, the reaction may be illustrated in accordance with the following equation:

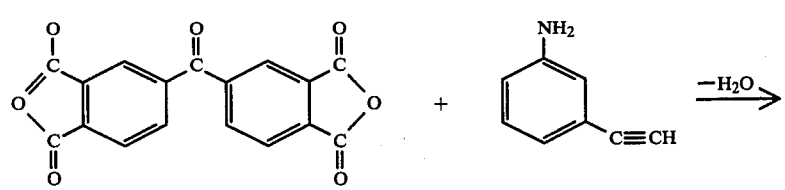

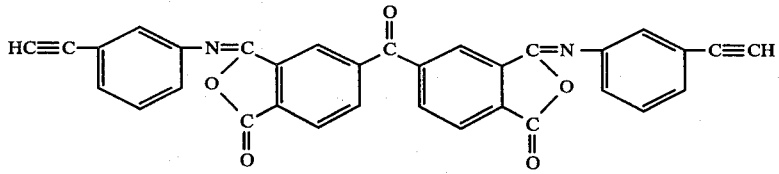

As shown in the above equation, the oligomer produced contains an isoimide group in both positions where either an isoimide or imide group could be formed. It should be understood by those skilled in the art, however, that it is not necessary that an isoimide group be formed in every position where an isoimide group could be formed, it being sufficient that the number of isoimide groups present in the oligomer be sufficient to reduce the melting point of the oligomer and increase its solubility in common solvents, as compared to the same oligomer without any isoimide groups, that is, the corresponding imide oligomer.

Oligomers of the foregoing type can thus be homopolymerized, either with or without the use of a catalyst in accordance with the techniques described in U.S. Pat. No. 3,845,018 and U.S. Pat. No. 3,879,349. The greater solubility in common solvents and reduced melting point provides a significant advantage in the processability of the oligomer, enabling it to be cured more slowly in a controlled manner as compared to the corresponding oligomers prepared from the same reagents whch contain only imide groups.

In accordance with another embodiment of the invention, use can be made of an aromatic polyamine for reaction with the polyanhydride either before reaction with the monomer or simultaneously therewith. In this embodiment of the invention, the polyamine serves to link together two or more anhydride groups, the resulting structure containing as terminal groups a monoamine substituted with a functional group capable of undergoing addition polymerization.

Again using benzophenonetetracarboxylic dianhydride and 3-aminophenylacetylene as well as 1,3-di-(3-aminophenoxy)benzene as illustrative, this latter concept may be illustrated by way of the following:

spersed randomly throughout the structure of the oligomer. The position of such isoimide groups present in the structure is not of particular importance, the important factor being that the isoimide groups be present in the oligomer in sufficient number to reduce the melting point of the oligomer and increase its solubility in common solvents. In general, it is sufficient that at least 30% of the positions which could be either isoimide or imide groups be isoimide groups.

In accordance with the preferred practice of the invention, a carboxylic acid dianhydride having the formula:

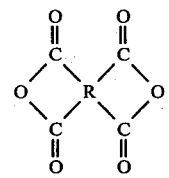

wherein R is a tetravalent organic group containing 2 to 27 carbon atoms is reacted with a functional monoamine having the formula $H_2N-R_1-X$ wherein $R_1$ is a divalent organic group containing 1 to 20 carbon atoms and X is a functional group capable of undergoing addition polymerization, either with itself or with a comonomer, to form the corresponding polyamic acid. The resulting polyamic acid is then dehydrated, preferably with a dehydrating agent, to form a corresponding isoimide and/or isoimide-imide containing oligomer.

The resulting oligomer can be one of two position isomers, either the cis isomer

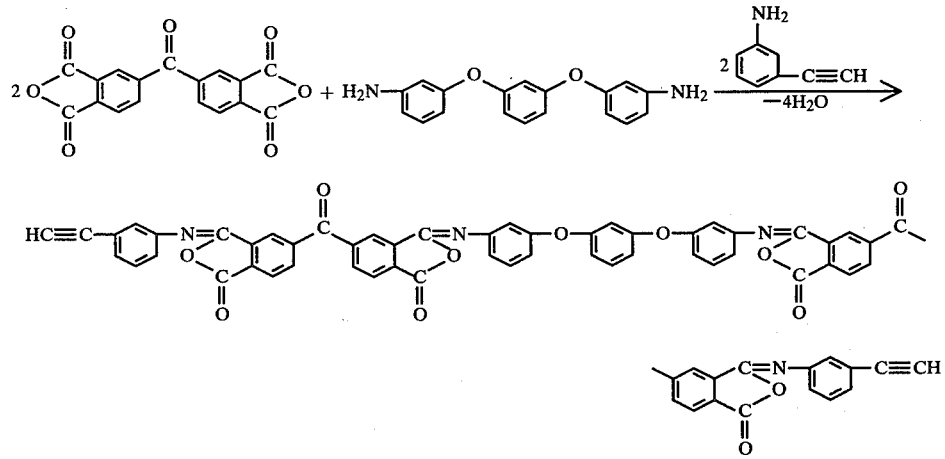
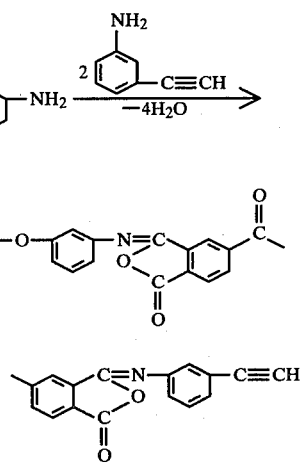

In the above product as structurally shown, all of the potential sites where either an isoimide or imide group could be formed have been arbitrarily shown in the isoimide form. In actual practice, however, the isoimide groups are formed along with imide groups and inter-

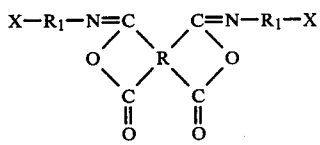

or the corresponding trans isomer:

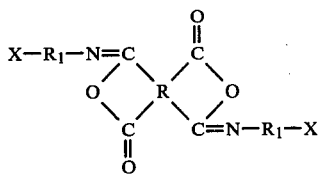

In actual practice, the oligomer is frequently a mixture of the above two isomers along with smaller amounts of oligomers containing an isoimide group and an imide group having the structure:

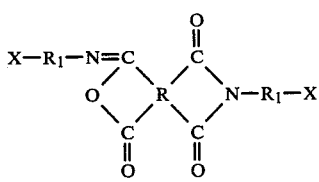

In addition, the reaction product may also contain small amounts of the corresponding di-imide.

The carboxylic acid dianhydride is one in which the R group is preferably an aryl group contaning 6 to 18 carbon atoms. Representative of such groups are the following:

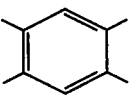

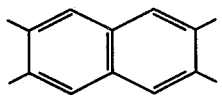

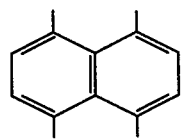

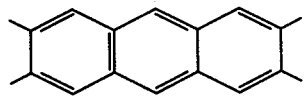

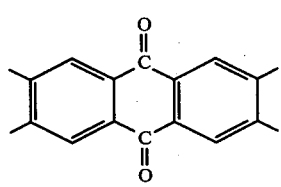

-continued

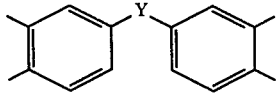

where Y is

where x is an integer from 1 to 5, —O—, —S—, —SO$_2$—, —(CF$_2$)$_x$—, —C(CF$_3$)$_2$— where x is as defined above, as well as the following groups:

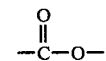

wherein R$_2$ and R$_3$ are aryl (such as phenyl and substituted derivatives thereof) or alkyl containing 1 to 5 carbon atoms.

Such anhydrides are known to those skilled in the art and are described in U.S. Pat. Nos. 3,261,811 and 3,345,342, the disclosures of which are incorporated herein by reference. Typical of such anhydrides are:
pyromellitic anhydride
3,4,3′,4′-benzophenone tetracarboxylic dianhydride
2,3,6,7-naphthalene tetracarboxylic dianhydride
3,3′,4,4′-diphenyl tetracarboxylic dianhydride
1,2,5,6-naphthalene tetracarboxylic dianhydride
2,2′,3,3′-diphenyl tetracarboxylic dianhydride
2,2-bis(3,4-dicarboxyphenyl)propane dianhydride
bis(3,4-dicarboxyphenyl) sulfone dianydride
3,4,9,10-perylene tetracarboxylic dianhydride
bis(3,4-dicarboxyphenyl)ether dianhydride
2,6-dichloronaphthalene-1,4,5,8-tetracarboxylic dianhydride
phenanthrene-1,8,9,10-tetracarboxylic dianhydride
1,1-bis(2,3-dicarboxyphenyl)ethane dianhydride
2,2-bis(3,4-dicarboxyphenyl)hexafluoroisopropylidene dianhydride
2,2-bis[4-(3,4-dicarboxyphenoxy)phenyl]hexafuoropropane dianhydride Other dianhydrides may also be used, including those containing heterocyclic rings, such as S-heterocycles, O-heterocycles, N-heterocycles and combinations thereof. For example, use can also be made of pyrazine-2,3,5,6-tetracarboxylic dianhydride or thiophene-2,3,4,5-tetracarboxylic dianhydride.

As the mono-amine reacted with the dianhydride, use should be made of a mono-amine which is substituted with a functional group capable of undergoing addition polymerization reactions. Such functional groups are well known to those skilled in the art. In general, the functional group is one containing carbon-to-carbon unsaturation, usually ethylenic unsaturation or acetylenic unsaturation; it is also possible to employ, as the functional group, a cyano group which can be copolymerized by reaction with, for example, terephthalonitrile-N,N'-dioxides as described in U.S. Pat. No. 3,864,309, the disclosure of which is incorporated herein by reference.

It is preferred that the mono-amine have the formula $H_2N-R_1-X$ wherein $R_1$ is a divalent organic group containing 1 to 20 carbon atoms and X is the functional group. X is preferably selected from the group consisting of $C\equiv CH$, $-CH=CH_2$, $-CN$ or the following group:

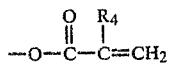

$R_4$ is H or $-CH_3$. Representative of suitable amines are allyl amine, propargyl amine, 3-aminophenyl acetylene, 3-(3-aminophenoxy)phenyl acetylene, 3-aminostyrene, 3-amino-, -4-bromostyrene, 3-aminobenzonitrile, 4-aminophenyl acrylate 3-aminobenzyl methacrylate, 4-aminobenzylmethacrylate, etc.

In carrying out the reaction between the dianhydride and the mono-amine as described above, conventional reaction conditions typically used in the preparation of isoimides, such as those described in U.S. Pat. No. 3,345,352, may be used. In general, the reactions carried out in accordance with the practice of this invention employ at least one mole of the mono-amine per mole of the dianhydride. Preferably, the mono-amine is reacted with the dianhydride in a molar ratio ranging from about 1.2 to about 2.5 moles of mono-amine per mole of dianhydride, although it will be understood that greater amounts of the mono-amine may be used. The reaction is preferably carried out in the presence of a solvent, such as an aliphatic ether solvent, although other inert or reactive solvents may be used.

The temperature at which the reaction is carried out is not critical, and depends, to some degree, on the nature of the dianhydride being used and the particular amine being used. Best results are usually achieved when the reaction temperature is maintained below 100° C. Higher temperatures can cause the amic acid to cyclize to the corresponding imide.

After the reaction has been completed, the product is in the form of a polyamic acid which can be converted to the corresponding isoimide through the use of a dehydrating agent. Such dehydrating agents, and their use in forming isoimides, are well known to those skilled in the art and are described in U.S. Pat. No. 3,261,811, the disclosure of which is incorporated herein by reference. The dehydrating agent preferred for use in the practice of the present invention is trifluoracetic anhydride. Other dehydrating agents include N,N-disubstituted carbodiimide, such as N,N-dicyclohexyl carbodiimide dissolved in N,N-dimethyl acetamide and ketene. It is generally preferable to carry out the dehydration reaction at a relatively low temperature, usually below 60° C.

As noted above, another embodiment of the invention includes the use of an aromatic polyamine which is reacted with the dianhydride, preferably prior to reaction with the mono-amine. The polyamine, and preferably a diamine, serves to link together two or more moles of the dianhydride, leaving terminal anhydride groups capable of reaction with the mono-amine. In general, use is made of at least one mole of the polyamine for each mole of the dianhydride and at least one mole of the mono-amine per mole of the dianhydride.

The diamine is preferably a compound having the formula:

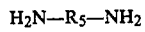

wherein $R_5$ is a divalent aromatic group, preferably containing 6 to 30 carbon atoms. Preferred are arylene, arylene ether, and arylene thioether groups. Representative of such groups include a phenylene group or a naphthylene group as well as a group having the formula:

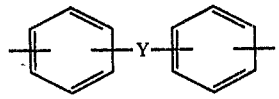

wherein Y is

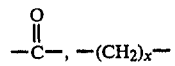

where x is an integer from 1 to 5, $-O-$, $-S-$, $-SO_2-$, $-(CF_2)_x-$, $-C(CF_3)_2-$ where x is as defined above, and the following groups:

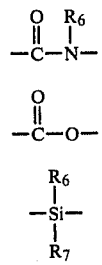

wherein $R_6$ and $R_7$ are aryl (such as phenyl and substituted derivatives thereof) or alkyl containing 1 to 5 carbon atoms.

In addition, $R_5$ can also be a group of the formula:

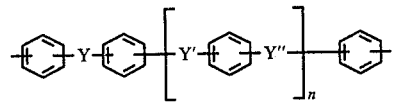

wherein Y, Y' and Y'' are each the same or different and are selected from the same group as Y as defined above. As will be appreciated by those skilled in the art, the aryl groups set forth above as being part of the $R_5$ group can also be substituted with, for example, one or more halogen atoms, lower alkyl groups and/or lower alkoxy groups.

Such diamines are well known to those skilled in the art and are described in detail in U.S. Pat. Nos. 3,261,811 and 3,345,352. Typical of such amines are:
meta-phenylenediamine,
2,2-bis(4-aminophenyl)propane,
4,4'-diaminodiphenyl methane,
4,4'-diaminodiphenyl sulfide,
4,4'-diaminodiphenyl sulfone,
3,3'-diaminodiphenyl sulfone,
2,6-diaminopyridine,
bis-(4-aminophenyl)diethylsilane,
bis-(3-aminophenyl)ethyl phosphine oxide, 1,3-di(3-aminophenoxy)benzene
2,2-di(3-aminophenyl)hexafluoropropane
2,2-di(4-aminophenyl)hexafluoropropane Without limiting the invention as to theory, it is believed that the diamine reacts with the anhydride to form the corresponding polyamic acid having free acid anhydride groups available for reaction with the mono-amine. It is generally preferred that the carboxylic dianhydride be as pure as possible, and preferably free of the corresponding carboxylic acid. Without limiting the invention as to theory, it is believed that carboxylic acid impurities in the dianhydride results in the formation of amine salts which catalyze the conversion of isoimide groups to the corresponding imide groups. After the reaction between the dianhydride and the diamine has been completed, it is generally preferable to introduce the mono-amine for reaction with those free terminal acid anhydride groups to form an oligomer end-blocked with the mono-amine. That reaction product is then subjected to dehydration to convert the polyamic acid to the corresponding isoimide.

That overall reaction, again without limiting the present invention as to theory, may be illustrated diagramatically as follows:

to produce a DP of 1 requires the reaction of 1 mole of diamine with 2 moles of dianhydride and 2 moles of mono-amine. When those proportions are used, the reaction produced contains predominantly a product in which the DP is 1, but also contains in decreasing proportion, oligomers in which the DP is 2, 3, 4 and so on as well as small amounts of oligomers formed by the reaction of 1 mole of the dianhydride and 2 moles of the mono-amine—thus containing no diamine at all.

In general, when it is desired to produce an oligomer having a DP of 1, the reactants are used in mole proportions of 0.5 to 1.5 moles of the diamine, 1.5 to 2.5 moles of the dianhydride, and 1.5 to 2.5 moles of the mono-amine. When an oligomer having a DP of 2 is desired, the molar proportions range from 1.5 to 2.5 moles of the diamine, 2.5 to 3.5 moles of the dianhydride, and 1.5 to 2.5 moles of the mono-amine. Similarly, when a DP 3 oligomer is desired, the molar proportions are about 2.5 to 3.5 moles of the diamine, 3.5 to 4.5 moles of the dianhydride, and 1.5 to 2.5 moles of the mono-amine.

The above structure is, as those skilled in the art will appreciate, an idealized structure, depicting as it does all of the positions where an isoimide or imide group could be formed as isoimide groups. As noted above, such an

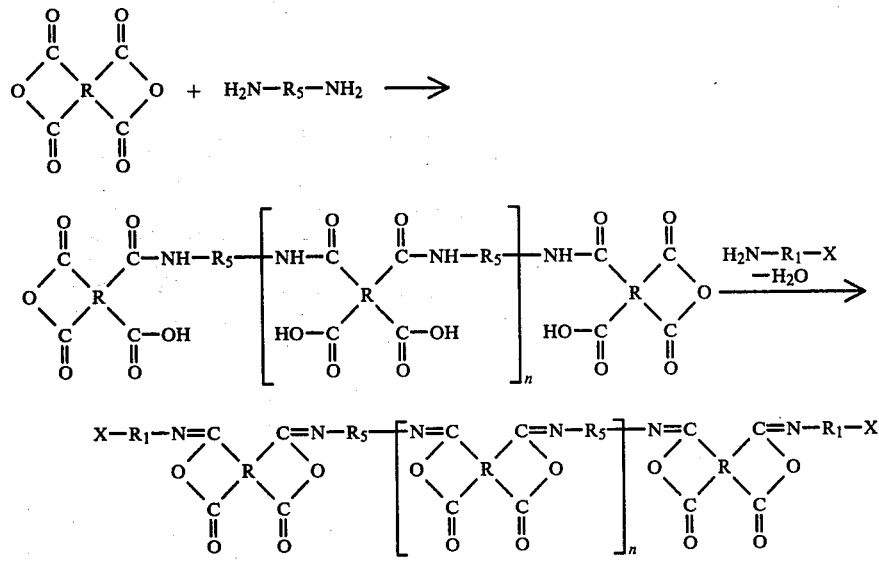

As shown in the preceding equation, the dianhydride reacts first with the diamine to form the corresponding polyamic acid, with the number of moles of diamine entering into the reaction depending on the proportion of the reactants. In the equation shown, n is 0 or an integer ranging from 1 to about 15 or higher, depending on the reactant proportions. That variable is generally referred to as the degree of polymerization of the oligomer, commonly denoted DP. When n is 0, the oligomer contains a single mole of diamine for each two moles of dianhydride present, and thus the degree of polymerization is 1. When n equals 1, and thus 2 moles of diamine are present for each 3 moles of dianhydride, the degree of polymerization is 2, and so on.

As will be appreciated by those skilled in the art, the predominant degree of polymerization can be controlled by controlling the proportions of the reactant. Nonetheless, there is always a tendency for the reaction to form mixtures. For example, in the preparation of an oligomer of the type shown above having a DP of 1 (n=0), the idealized proportions of a reactant necessary idealized reaction product is difficult, if not impossible, to achieve because of the tendency to form imide groups along with isoimide groups. Of course, there is also the tendency of the reaction to produce both cis and trans isomers as well as mixtures thereof. However, the positions at which the isoimide groups form are not critical to the practice of the invention; the important feature is that the isoimide groups be present in a sufficient number so as to reduce the melting point of the resulting oligomer and increase its solubility in common lacquer solvents such as dialkyl ketones, tetrahydrofuran. While the proportion of isoimide groups necessary to reach that result varies somewhat with the nature of the reactants used in preparing the oligomers, it has been found that at least 30% isoimide groups serve to decrease the melting point and increase the solubility of the resulting oligomers.

Preferred oligomers, in accordance with this embodiment, are prepared from an dianhydride such as 3,4—3',4'-benzophenonetetracarboxylic dianhydride, an amine-terminated aryl polyether, and an amino phenylacetylene mono-amine.

In accordance with yet another embodiment of the present invention, it is also possible, and sometimes desirable, to employ reactants in which the end-capping group containing a polymerizable functional group also contains an anhydride group. In accordance with this embodiment of the invention, a dianhydride having the formula:

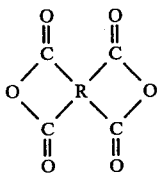

is reacted with a diamine having the formula:

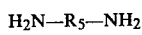

to form an amine-terminated polyamic acid which is then reacted with an anhydride having the formula:

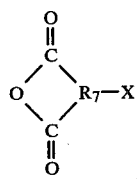

wherein $R_7$ is a trivalent organic group, which is preferably an aryl group or an alkenylene group and X is a functional group capable of undergoing addition polymerization reactions as described above.

The resulting product is then subjected to a dehydration reaction to convert at least some of the amic acid groups to isoimide groups. This concept, without limiting the invention as to theory, may be illustrated by the following equation:

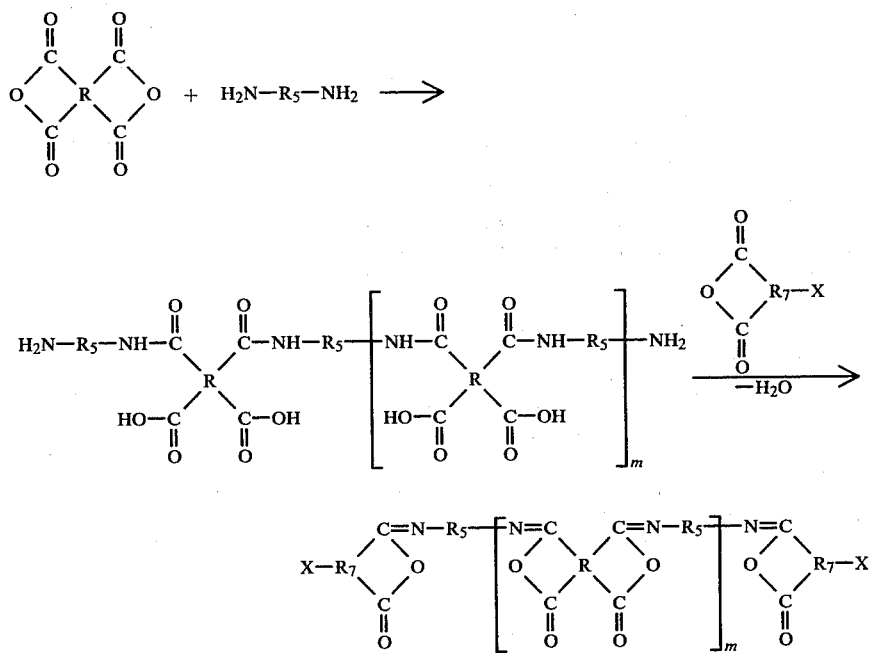

In the foregoing equation, m denotes the degree of polymerization, with $m=1$ denoting a DP of 1, and so on such that m is 1 to about 15 or higher, depending on the reactant proportions. As with the preceding equations, the products shown above are illustrated in an idealized form, with all of the sites where either imide or isoimide groups could be formed taking the form of an isoimide group. In actual fact, again, some of those groups are in the imide form.

As the functional anhydride, use can be made of a variety of mono-anhydrides, such as the following:
4-ethynyl-phthalic anhydride,
4-vinyl-phthalic anhydride
4-cyano-phthalic anhydride
Maleic anhydride
Bicyclo[2,2,1]hept-2-ene-5,6-dicarboxylic anhydride The use of maleic anhydride produces an oligomer containing the following idealized structure:

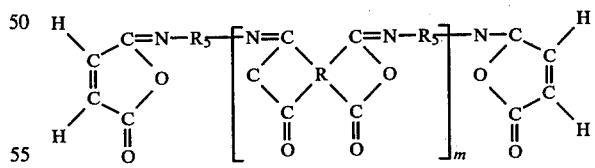

while the use of a bicycloheptene anhydride of the formula:

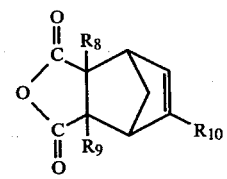

wherein $R_8$, $R_9$ and $R_{10}$ are each H or lower alkyl yields an idealized structure as follows:

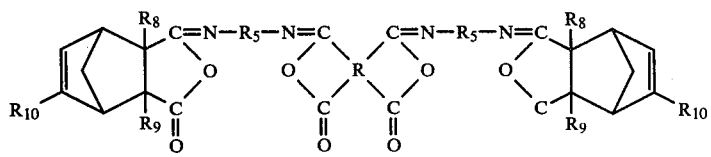

The oligomers of the present invention are used in the same manner as those described in U.S. Pat. Nos. 3,864,309, 3,845,018, 3,879,349 and 3,928,450 to produce cured resins having high strength and temperature characteristics as well as low void contents. Without limiting the present invention as to the theory, it is believed that the isoimide groups present in the oligomers of this invention are, when subjected to elevated temperature during cure, convert to the corresponding imide. Thus, the properties and physical characteristics of cured resins made from the oligomers of the present invention are virtually the same as those described in the foregoing patents.

Having described the basic concepts of the present invention, reference is now made to the following examples, which are provided by way of illustration, and not by way of limitation, of the practice of the invention in making the oligomers and using them in the form of cured resins.

EXAMPLE 1

This example illustrates the preparation of a bis-isoimide from a mono-amine and a dianhydride.

Benzophenonetetracarboxylic dianhydride (15.0 grams; 0.0466 mole) in 250 ml of tetrahydrofuran at 60°–65° C. was reacted with 3-aminophenylacetylene (10.9 grams, 0.0932 mole) for 1 hour. The solution was cooled and treated with trifluoroacetic anhydride (60 grams) maintaining the temperature at 10°–18° C. The reaction mixture was kept at 20°–25° C. for 18 hours and the bis-isoimide recovered by precipitation in hexane and then dried in vacuum. The bis-isoimide was mostly isoimide (about 90%); the remainder, imide as determined by infrared spectroscopy. A yield of 17 grams was isolated, melting at 115°–120° C.

EXAMPLE 2

This example illustrates the preparation of an acetylene-terminated isoimide oligomer having a degree of polymerization of 1.

A three-necked one liter round bottom was fitted with a heating mantle, Tru-bore stirrer, reflux condenser, thermometer and addition funnel. The top of the reflux condenser was protected from atmospheric moisture with a drying tube.

The flask was charged with benzophenonetetracarboxylic dianhydride (30 grams, 0.0932 mole) and dry tetrahydrofuran (300 ml). The solution was heated to a gentle reflux and a solution of 1,3-di(3-aminophenoxy)-benzene (13.9 grams, 0.0476 mole) in dry tetrahydrofuran (125 ml) was added dropwise over a 30–40 minute period. Then the reaction mixture was stirred for an additional 30 minutes and a solution of 3-aminophenylacetylene (10.9 grams, 0.0932 mole) in dry tetrahydrofuran (30 ml) added.

After the addition, the solution was heated at a gentle reflux for an additional 30 minutes, cooled to ambient and trifluoroacetic anhydride (110 grams) added dropwise, maintaining the temperature at ambient by means of an ice bath. The reaction mixture was maintained at room temperature for approximately 18 hours. The oligomer was then precipitated by pouring the reaction mixture into 2300 ml of hexanes and the oligomer washed with fresh hexane.

The product was dried in the rotary film evaporator at 85° C. for several hours. The bright yellow oligomer weighed 52 grams. The product showed a characteristic infrared isoimide absorption at 1805 cm$^{-1}$ with only a very small amount of imide at 1780 cm$^{-1}$. The oligomer melts at 150°–155° C.

EXAMPLE 3

This example illustrates the preparation of an oligomer having a degree of polymerization of 3.

To a solution of benzophenonetetracarboxylic dianhydride (71.4 grams, 0.2217 mole) in dioxane (700 ml) at 70° C., a solution of 1,3-di(3-aminophenoxy) benzene (48.5 grams, 0.1661 mole) in dioxane (400 ml) was added dropwise over a one hour period. The solution was stirred for 30 minutes and 3-aminophenylacetylene (13.0 grams, 0.111 mole) added all at once. After stirring at 65°–70° C. for 2 hours, trifluoroacetic anhydride (275 grams) was added over a 15 minute period. The mixture was heated for an additional hour, cooled and the yellow oligomer (135 grams) isolated by precipitation in hexane.

EXAMPLE 4

This example illustrates the preparation of an oligomer having a degree of polymerization of ten.

A three-necked, 1-liter, round-bottomed flask was fitted with a heating mantle, Tru-bore stirrer, thermometer, reflux condenser and addition funnel. The opening of the reflux condenser was protected with a Drierite filled tube. The flask was charged with benzophenonetetracarboxylic dianhydride (28.1 grams, 0.0873 mole) and dry tetrahydrofuran (300 ml). The mixture was heated to just below reflux and a solution of 1,3-di(3-aminophenoxy) benzene (23.2 grams, 0.0795 mole) in dry tetrahydrofuran (250 ml) was added dropwise over a 1-hour period. Then a solution of 3-aminophenylacetylene (1.86 grams, 0.01585 mole) in a dry tetrahydrofuran (10 ml) was added. After the addition, the solution was heated at reflux for another hour, cooled to 10° C., and trifluoroacetic anhydride (120 grams) added dropwise with good stirring.

The reaction mixture was kept at ambient temperature for approximately 18 hours. The insoluble taffy-like product was triturated with approximately 125 ml of dry tetrahydrofuran to dissolve the product. This was poured into 1 liter of hexanes which precipitated the oligomer. The rest of the reaction mixture was poured into 1 liter of hexanes and the precipitated product filtered, washed with hexane, and dried in the rotary film evaporator under vacuum at 80° C. The product weighed 49 grams.

Films cast from a dimethylformamide solution, and cured at 700° F. for one hour, yielded tensile strengths of 14,000 psi at room temperature and elongations of 3%.

EXAMPLE 5

This example illustrates the preparation of another oligomer having a DP of 1.

To a solution of benzophenonetetracarboxylic dianhydride (48.3 grams, 0.150 mole) in tetrahydrofuran (500 ml) at 60°–65° C., a solution of 4,4′-oxydianiline (15.0 grams, 0.075 mole) in tetrahydrofuran (200 ml) was added dropwise over a 35 minute period. After the addition, the reaction mixture was heated at reflux for another 30 minutes and a solution of 3-aminophenylacetylene (17.6 grams, 0.1630 mole) in tetrahydrofuran (100 ml) was added, the mixture was heated at reflux for 30 more minutes and cooled to about 5° to 10° C. Then trifluoroacetic anhydride (200 grams) was added and the mixture stirred for about 16–18 hours. The yellow product (60 grams) was isolated by precipitation in hexane.

Infrared spectroscopy showed that the product had the characteristic isoimide peak at 1805 cm$^{-1}$ and only a very small amount of imide at 1780 cm$^{-1}$. It was soluble in acetone, tetrahydrofuran and a number of other solvents. It melted at 160°–165° C. and cured readily above its melting point. A Tg greater than 400° C. was obtained for this product.

EXAMPLE 6

This example illustrates the preparation of a maleic anhydride capped oligomer having a DP of 1.

To a solution of 1,3-di(3-aminophenoxy) benzene (40.0 grams, 0.1342 mole) in tetrahydrofuran (300 ml) at 60°–65° C., a warm solution of benzophenonetetracarboxylic dianhydride (21.6 grams, 0.06711 mole) in tetrahydrofuran (525 ml) was added dropwise over a 45 minute period. After the addition the solution was heated for an additional 45 minutes and a solution of maleic anhydride (13.2 grams, 0.1342 mole) in tetrahydrofuran (100 ml) was added, the solution heated for 45 minutes more, cooled to 10° C. and trifluoroacetic anhydride (200 grams) added dropwise. After stirring at 20°–25° C. for 18 hours the product (57 grams) was isolated by precipitation in hexane and vacuum drying. This oligomer had appreciable solubility in a number of solvents, (acetone, tetrahydrofuran, glycolic ethers) and melted 155°–160° C.

Each of the oligomers prepared in Examples 1–6 was compared to the corresponding oligomer which was in the imide form, as opposed to the isoimide form. In each case, the isoimide oligomers of this invention were soluble in ketones, alcohols, amides, glycol ethers and cycloaliphatic ethers (all of which are common lacquer solvents) whereas the corresponding imide oligomers were insoluble in such solvents, being soluble only in N-methylpyrrolidinone and N,N-dimethylformamide.

In addition, the melting points of the various oligomers were compared, as well as, in some instances, the gel time. The results of these comparisons is set forth in the following table:

TABLE 1

| Form | Composition | Melting Point | Gel Time Min (T °C.) |
|---|---|---|---|
| Isoimide | Example 1 | 115–120° C. | 0 |
| Imide form | | Intractable | |
| Isoimide | Example 2 | 145–150° C. | 15–30 (191° C.) |
| Imide form | | >200° C. | 3 (250° C.) |
| Isoimide | Example 3 | 150–155° C. | 15–30 (191° C.) |

TABLE 1-continued

| Form | Composition | Melting Point | Gel Time Min (T °C.) |
|---|---|---|---|
| Imide form | | >200° C. | 3–5 (250° C.) |
| Isoimide | Example 4 | 160–165° C. | |
| Imide form | | >200° C. | |
| Isoimide | Example 5 | 155–160° C. | |
| Imide form | | >230° C. | |
| Isoimide | Example 6 | 150–160° C. | |
| Imide form | | — | |

In each instance, the isoimide form of the oligomer embodying the concepts of this invention had a melting point considerably lower than the corresponding imide form.

EXAMPLE 7

This example illustrates the preparation of a cyano-terminated isoimide having a DP of 1.

Using the procedure described in Example 2, 1 mole of 3,3′,4,4′-diphenyltetracarboxylic dianhydride is reacted with ½ mole of bis(4-aminophenyl)dimethyl silane, and then the product of the reaction is reacted with 1 mole of 3-aminobenzonitrile.

The product is then dehydrated, and analyzed for infrared isoimide absorption. The resulting isoimide oligomer can be copolymerized with terephthalonitrile-N,N′-dioxide to form a copolymer in accordance with the teachings of U.S. Pat. No. 3,864,309.

EXAMPLE 8

This example illustrates the preparation of a bis-isoimide prepared from pyromellitic anhydride and 3-aminophenyl methacrylate.

Using the procedure illustrated in Example 1, 1 mole of pyromellitic anhydride is reacted with 2 moles of 3-aminophenyl methacrylic acid. After the reaction is completed, the reaction mixture is cooled and dehydrated using ketene as a dehydrating agent.

Infrared absorption demonstrates the presence of isoimide groups.

EXAMPLE 9

This example illustrates the preparation of a bis-isoimide form allylamine and 2,3,6,7-naphthalenetetracarboxylic dianhydride.

Using the procedure described in Example 1, the above reactants are refluxed to form the corresponding polyamic acid, and then the reaction product is dehydrated with trifluoroacetic anhydride.

Infrared absorption indicates the presence of isoimide groups.

EXAMPLE 10

This example illustrates the preparation of a film from an acetylene-terminated isoimide having a degree of polymerization of ten (from Example 4).

A 20 weight percent solids content of the oligomer in solvents such as methyl ethylketone, N,N-dimethylformamide, N,N-dimethylacetamide or N-methylpyrrolidinone is cast on a glass plate with a doctor blade to yield a 1–2 mil wet film. The plate with the film is prebaked at 150° F. for 1 hour and then cured stepwise using 400° F. for 15 minutes; 500° F. for 15 minutes, 600° F. for 15 minutes and finally at 700° F. for 1 hour in an air-circulating oven.

The film made in this way was found to have a tensile strength of 14,000 psi and an elongation of 3 percent. A Tg as determined using TMA was found to be 230° C.

EXAMPLE 11

This example illustrates the preparation of a graphite fiber composite using standard-vacuum bag technology.

An acetylene-terminated isoimide having a degree of polymerization of one (from Example 2) was dissolved in a 95:5 percent by volume mixture of methylethylketone:N-methylpyrrolidinone to a solids content of 25 percent by weight. The lacquer was brushed on unidirectional HTS-2 fibers wound on a 5"×6" aluminum tool. The prepreg was air dried until the methylethyl ketone has evaporated. This was repeated until the wet resin content was brought up to about 40–45 percent.

The dried graphite prepreg was laid up into 8 ply construction in the following orientation: 0°, 90°, 90°, 0°, 0°, 90°, 90°, 0°. When required for additional tack, the prepreg was mist coated with N-methylpyrrolidinone. The construction was placed into a vacuum oven with 2 plies of air weave and 1 ply of TX 1040 on the outer prepreg surfaces and dried at 125° F. for 4 hours. The prepreg was taken out of the oven and rebagged as described above and placed into an autoclave. The initial pressure was 30 psi and 25 inches of mercury vacuum and the temperature raised to 375° F. in 30 minutes. Then the pressure increased to 150 psi with a 30 inch mercury vacuum and held for 2 hours. The part was cooled to 150° F. under air and vacuum pressure. The autoclave is then vented, the part removed and the formed part postcured in a standard air circulating oven. A dense non-porous laminate was obtained.

EXAMPLE 12

This example illustrates the preparation of a bis-isoimide prepared from pyromellitic anhydride and propargyl amine.

Using the procedure described in Example 1, one mole of pyromellitic anhydride in tetrahydrofuran is reacted with two moles of propargyl amine. The reaction mixture was cooled and then treated with a dehydrating agent while maintained at a temperature of about 20° C. The product is determined to be predominantly a bis-isoimide having the formula:

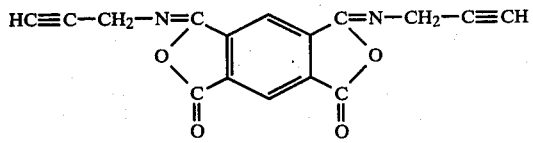

as well as the position isomer thereof.

EXAMPLE 13

This example illustrates the preparation of a bis-isoimide prepared by reaction of 3,3',4,4'-diphenyltetracarboxylic dianhydride and 3-aminobenzonitrile.

Using the procedure illustrated in Example 1, one mole of dianhydride is reacted with two moles of 3-aminobenzonitrile. After reaction and subsequent dehydration, there is isolated from the reaction a bis-isoimide in the form of a mixture of the cis and trans isomers, the trans isomer having the formula:

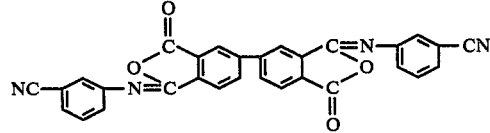

EXAMPLE 14

This example illustrates the preparation of a bis-isoimide from reaction of bis(3,4,-dicarboxylicphenyl)sulfone dianhydride with 3-(3-aminophenoxy)phenyl acetylene.

Using the procedure illustrated in Example 1, one mole of dianhydride is reacted with two moles of the monoamine. After the reaction is completed, the product is dehydrated with trifluoroacetic anhydride to form a mixture of cis and trans isomers of an isoimide, the cis isomer having the following structure:

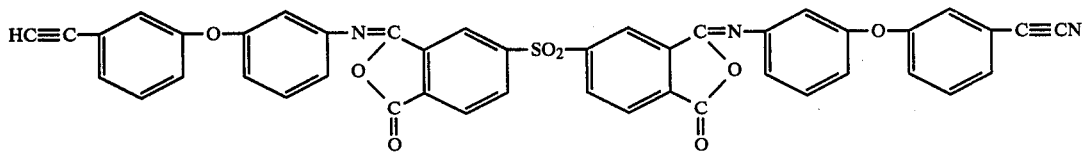

EXAMPLE 15

This example illustrates the preparation of bisisoimide having a DP of 1.

Using the procedure described in Example 2, two moles of 2,2-bis(3,4-dicarboxyphenyl)propane dianhydride are reacted with 1 mole of 1,3-di(3-aminophenoxy)benzene, and then the product of the reaction is reacted with 3-aminobenzonitrile. After the polyamic acid is formed, the product of the reaction is dehydrated with trifluoroacetic anhydride to form an isoimide-containing oligomer.

EXAMPLE 16

This example illustrates the preparation of an oligomer having a DP of 1.

Using the procedure described in Example 2, two moles of pyromellitic anhydride are reacted with one mole of oxydianiline, and then two moles of 3-aminophenyl acetylene are added to the reaction. The reaction mixture is then cooled and dehydrated with trifluoroacetic anhydride to form the corresponding isoimide-containing oligomer. It has been determined that yield of isoimide groups, to the exclusion of imide groups, is increased when the anhydride is purified to remove all carboxylic acid-containing impurities.

EXAMPLE 17

This example illustrates the preparation of an isoimide-containing oligomer having a DP of 1.

Using the procedure described in Example 2, two moles of 2,2-bis(3,4-dicarboxyphenyl)hexafluoroisopropylidine dianhydride are reacted with one mole of 2,6-diaminopyridine. The product is then reacted with 3-(3-aminophenoxy)phenyl acetylene. The reaction mixture is cooled and dehydrated to form the corresponding isoimide-containing oligomer.

EXAMPLE 18

This example illustrates the preparation of an isoimide-containing oligomer having a DP of 1 similar to the oligomer of Example 1 but containing very little imide isomer.

A 1 liter, three-necked round bottom flask fitted with a Tru-bore stirrer, thermometer and dropping funnel was charged with carboxylic acid free benzophenonetetracarboxylic dianhydride (45 grams, 0.1398 mole) and dry tetrahydrofuran (400 ml). To the slurry, at 27° C. (ambient), a solution of 1,3-di(3-aminophenoxy)benzene (20.40 grams, 0.06988 mole) in dry tetrahydrofuran (200 ml) was added dropwise with good stirring. Shortly after starting the addition, all the solids went into solution. Then to the light amber, clear solution, a solution of 3-aminophenylacetylene (16.35 grams, 0.1398 mole) in dry tetrahydrofuran (100 ml) was added.

The solution was allowed to stand at ambient temperature for approximately 16 hours and then cooled to −10° C. Trifluoroacetic anhydride (68.5 grams, 0.326 mole) was added dropwise carefully maintaining the temperature below 0° C. The addition took approximately 10 minutes. After the addition, the solution was allowed to stand for 105 minutes and the oligomer precipitated by pouring the solution into a large quantity of hexane (4 liters). The oligomer was filtered and washed with fresh hexane and dried under vacuum, starting first at ambient temperature and finally increasing the temperature to 90° C.

The oligomer (72 grams) was mostly isoimide as evidenced by the presence of the 1805 cm$^{-1}$ peak in an infrared spectrogram and no peak at 1780 cm$^{-1}$ (imide).

It will be understood that various changes and modifications can be made in the details of procedure, formulation and use without departing from the spirit of the invention, especially as defined in the following claims.

I claim:

1. A polymerizable isoimide-containing oligomer prepared by:

(a) reacting a carboxylic acid anhydride having the formula:

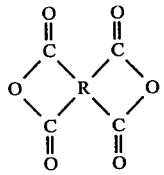

where R is a tetravalent organic group containing 2 to 27 carbon atoms, with a functional amine having the formula:

$H_2N-R_1-X$ wherein $R_1$ is a divalent organic group containing 1 to 20 carbon atoms and X is a radical selected from the group consisting of —C≡CH, —CH=CH$_2$, —CN, and

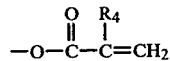

where $R_4$ is H or CH$_3$; and (b) dehydrating the product under conditions to form an isoimide-containing oligomer having the formula:

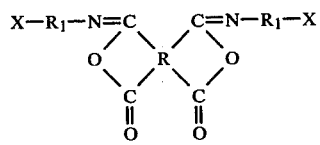

where $R_1$ and X are defined above.

2. Cis and trans isomers of an oligomer having the formulae:

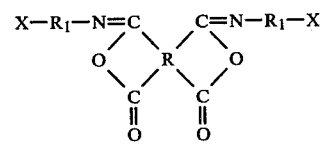

and

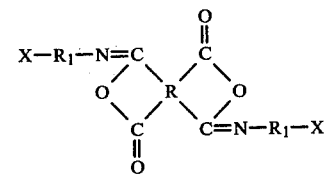

where R is a tetravalent organic group containing 2 to 27 carbon atoms, $R_1$ is a divalent organic group containing 1 to 20 carbon atoms, and X is a radical selected from the group consisting of —C≡CH, —CH=CH$_2$, —CN, and

where $R_4$ is H or CH$_3$.

3. An isoimide oligomer having the formula:

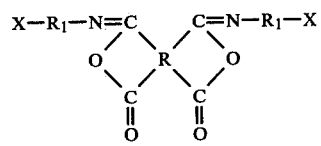

where R is a tetravalent organic group containing 2 to 27 carbon atoms, $R_1$ is a divalent organic group containing 1 to 20 carbon atoms, and X is a radical selected from the group consisting of —CH≡CH, —CH=CH$_2$, —CN, and

where $R_4$ is H or CH$_3$.

4. An oligomer as defined in claim 1 wherein R is selected from the group consisting of aryl containing 6 to 18 carbon atoms.

5. An oligomer as defined in claim 3 wherein R is selected from the group consisting of:

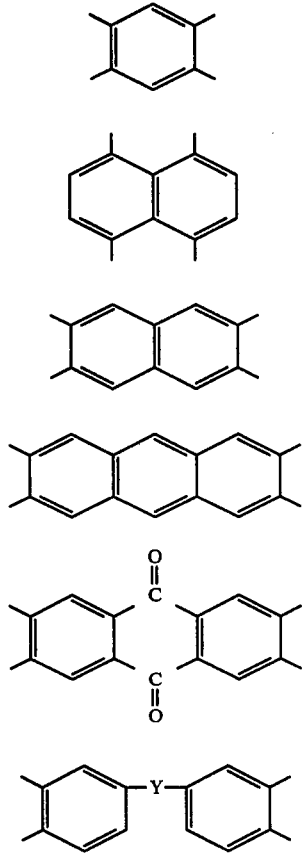

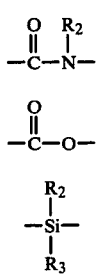

wherein Y is selected from the group consisting of

—(CH$_2$)$_x$—, —O—, —S—, —SO$_2$—, —C(CF$_3$)$_2$— —(CF$_2$)$_x$— wherein x is an integer from 1 to 5, and a group having the formula:

$$\begin{array}{c} O \quad R_2 \\ \| \quad | \\ -C-N- \end{array}$$

$$\begin{array}{c} O \\ \| \\ -C-O- \end{array}$$

$$\begin{array}{c} R_2 \\ | \\ -Si- \\ | \\ R_3 \end{array}$$

wherein R$_2$ and R$_3$ are each selected from the group consisting of aryl and alkyl.

6. A process for preparing an isoimide-containing oligomer which comprises:
(a) reacting a carboxylic acid dianhydride having the formula:

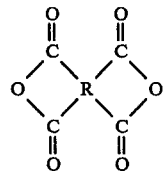

wherein R is a tetravalent organic group containing 2 to 27 carbon atoms, with a functional amine having the formula H$_2$N—R$_1$—X wherein R$_1$ is a divalent organic group containing 1 to 20 carbon atoms, and
(b) dehydrating the product under conditions to form an isoimide-containing oligomer having the formula:

where R and R$_1$ are defined above, and X is a radical selected from the group consisting of —C≡CH, —CH=CH$_2$, —CN, and

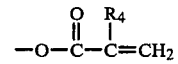

where R$_4$ is H or CH$_3$.

7. An oligomer as defined in claim 1 wherein the functional amine is 3-aminophenyl acetylene.

8. An oligiomer as defined in claim 1 wherein the dehydration is effected with a dehydrating agent.

9. An oligomer as defined in claim 8 wherein the dehydrating agent is trifluoroacetic anhydride.

10. An oligomer as defined in claim 1 wherein the anhydride is benzophenonetetracarboxylic dianhydride.

11. An oligomer as defined in claim 1 wherein the anhydride is a dianhydride having the formula:

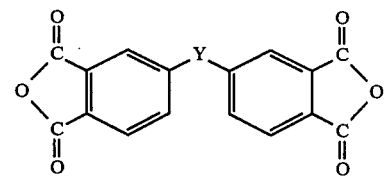

wherein Y is selected from the group consisting of

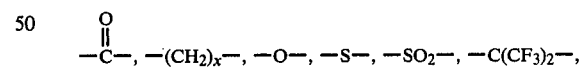

—(CF$_2$)$_x$— wherein x is an integer from 1 to 5, a group having the formula:

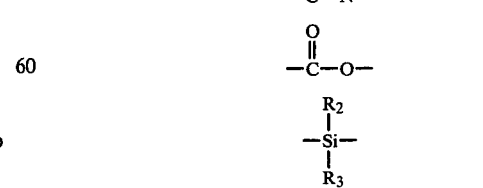

wherein R$_2$ and R$_3$ are each selected from the group consising of aryl and alkyl.

* * * * *